United States Patent [19]
Flor

[11] Patent Number: 5,242,669
[45] Date of Patent: Sep. 7, 1993

[54] HIGH PURITY POTASSIUM TETRAFLUOROALUMINATE AND METHOD OF MAKING SAME

[75] Inventor: Helmut Flor, Langenhagen, Fed. Rep. of Germany

[73] Assignee: The S. A. Day Mfg. Co., Inc., Buffalo, N.Y.

[21] Appl. No.: 910,962

[22] Filed: Jul. 9, 1992

[51] Int. Cl.$^5$ .................................................. C01F 7/54
[52] U.S. Cl. ...................................... 423/465; 423/464
[58] Field of Search ................................ 423/464, 465

[56] References Cited

U.S. PATENT DOCUMENTS

| | | | |
|---|---|---|---|
| 3,951,328 | 4/1976 | Wallace et al. | 228/207 |
| 4,273,593 | 6/1981 | Mastrangelo | 148/24 |
| 4,428,920 | 1/1984 | Willenberg | 423/465 |
| 4,475,960 | 10/1984 | Yamawaki et al. | 148/26 |
| 4,579,605 | 4/1986 | Kawase et al. | 148/26 |
| 4,619,716 | 10/1986 | Suzuki et al. | 148/26 |
| 4,689,092 | 8/1987 | Suzuki et al. | 148/26 |
| 4,723,597 | 2/1988 | Sonoda | 165/133 |
| 4,901,909 | 2/1990 | George | 228/223 |
| 4,923,530 | 5/1990 | Miki et al. | 148/26 |
| 4,941,929 | 7/1990 | Tecle | 148/24 |
| 5,100,048 | 3/1992 | Timsit | 229/198 |

*Primary Examiner*—Peter D. Rosenberg
*Attorney, Agent, or Firm*—Hodgson Russ Andrews Woods & Goodyear

[57] ABSTRACT

An improved method of making high quality potassium tetrafluoroaluminate. Hydrofluoric acid is added to high purity aluminum metal powder to form aluminum fluoride in solution. Nitric acid is added to this solution whereby impurities in the solution dissolve into the nitric acid. Water is then added to the solution to precipitate from the solution solid aluminum fluoride with impurities removed therefrom. The aluminum fluoride is then milled in the presence of hydrofluoric acid and potassium hydroxide whereby the exposure thereto produces the high quality potassium tetrafluoroaluminate which may then be washed and dried.

11 Claims, No Drawings

HIGH PURITY POTASSIUM TETRAFLUOROALUMINATE AND METHOD OF MAKING SAME

The present invention relates generally to fluxes used for brazing. More particularly, the present invention relates to potassium tetrafluoroaluminate ($KAlF_4$) which may be used for brazing aluminum or aluminum alloy parts.

Aluminum material is being used more frequently in heat exchangers, such as radiators for automobiles, due to the necessity of reducing the weight. In order to process the aluminum material into radiators or other products, it is necessary to join aluminum parts. It is also desirable to repair minor flaws to aluminum parts during the production process. Brazing offers a suitable joining and repairing method.

In the brazing of an aluminum material, a brazing alloy is used which has a melting point that is somewhat lower than that of the aluminum material being brazed. A typical brazing alloy is a eutectic alloy of aluminum and silicon. As the term is used herein and in the claims, the term "aluminum" is meant to include alloys thereof.

In order to suitably join the brazing alloy with the aluminum material, it is necessary to remove oxide films present on the surface of the aluminum material. In order to remove such films, a flux is applied along with the brazing alloy.

Art of interest as showing various materials and processes for the brazing of aluminum material are U.S. Pat. Nos. 3,951,328 to Wallace et al; 4,273,593 to Mastrangelo; 4,475,960 to Yamawaki et al; 4,579,605 to Kawase et al; 4,619,716 to Suzuki et al; 4,689,092 to Suzuki et al; 4,723,597 to Sonda; 4,901,909 to George; 4,923,530 to Miki et al; 4,941,929 to Tecle; and 5,100,048 to Timst.

Mastrangelo discloses a metal joining paste comprising a metal alloy powder, such as aluminum-silicon alloy powder, and a vehicle therefor, such as hydroxypropyl cellulose blended with glycerine and further blended with a mixture of polyalkoxyalkanols (including dialkylene glycols). Mastrangelo further discloses that the paste may optionally comprise a specialized flux, such as Nocolok flux, which represents a group of potassium fluoroaluminate complex fluxes developed by Alcan Aluminum Corporation. This flux has been found to have a melting temperature of about 585 degrees C.

Timsit discloses a method of brazing aluminum wherein a coating is applied to at least one of the aluminum surfaces to be joined. The coating comprises a mixture of a metal, preferably silicon, and a brazing flux. The brazing flux is described as preferably Nocolok flux. The coating is applied as a dry powder or as a slurry, preferably in a volatile carrier such as an alcohol.

Wallace et al discloses a method of joining metal surfaces by means of a flux comprising a mixture of potassium fluoroaluminates. The flux may be mixed with an aluminum alloy of a type used as a brazing alloy and with a resinous vehicle.

George is directed to a polybutene containing paste comprising a flux material and an alloy filler such as aluminum-silicon eutectic alloy powder. The flux comprises aluminum fluoride, potassium fluoride, and cesium chloride.

Tecle discloses a solder paste formulation comprising stannous fluoride, a metal alloy such as a silicon alloy, and a carrier such as ethylene glycol, glycerol, and mixtures thereof.

The remaining ones of the above patents disclose the use of alkali (e.g., potassium) fluoroaluminates as fluxing materials and methods of making the same. These fluxes are used in brazing aluminum surfaces and may be utilized in combination with an aluminum-silicon alloy.

The flux materials disclosed in the above patents have various disadvantages including corrosive residues requiring washing and drying of brazed parts and have melting temperatures, such as 585 degrees C. for the flux of Mastrangelo and Timsit, which would foreclose the use of certain aluminum-silicon alloys having lower temperatures as filler materials therewith.

As described in the Suzuki et al '716 patent, potassium tetrafluoroaluminate ($KAlF_4$), which is desirably inactive to aluminum, has been used as a flux for brazing aluminum material. $KAlF_4$ is a complex salt which has been produced by mixing and melting equimolar amounts of potassium fluoride (KF) and aluminum fluoride ($AlF_3$) and pulverizing the product.

The Suzuki et al '716 patent states that the use of $KAlF_4$ as a flux has a drawback in that the method of supplying the flux to the brazing part is complicated. The method described therein is a conversion-coating process wherein the brazing powder, and a powdered brazing alloy if needed, is suspended in water, and the assembly to be brazed immersed therein and removed therefrom and dried thereby depositing the flux, or the flux and the brazing alloy, on the brazing part. Thereafter, the assembly is heated to a predetermined temperature to melt the flux and the brazing alloy whereby the brazing alloy penetrates through the brazing part and, when cooled, the brazing part is joined by the brazing alloy.

In order to provide a less complicated brazing process, the Suzuki et al '716 patent suggests that the aluminum material to be brazed be brought into contact with a treating solution containing potassium and fluorine ions to cause a chemical reaction between aluminum components and potassium and fluorine ions, thereby forming $K_2AlF_5$, which is present on the surface of the aluminum material as a uniform coating and acts as the flux during brazing. $K_2AlF_5$ undesirably breaks down and forms corrosive products on the surface of the aluminum material which affect the brazing quality and require a washing step of the aluminum material after brazing thereof.

The Suzuki et al '716 patent further discloses that aluminum products obtained while brazing with $KAlF_4$ are subject to pitting corrosion due to chlorine resulting from deicing salt, sea salt, or the like resulting in a tendency to form penetrated holes. In order to prevent this, Suzuki et al '716 states that it is required to form a zinc or zinc alloy layer for forming a pitting corrosion inhibiting layer on the surface of the aluminum material to be used, beforehand in a separate step. This is believed to be because the $KAlF_4$ described in Suzuki et al '716 must undesirably be a corrosive product in that it must have corrosive impurities in it.

The conversion-coating process as described in Suzuki et al '716 is not suitable for bonding fittings, connections, miscellaneous support angles, and the like as well as not being suitable for repairing flaws in parts so that they need not be scrapped. Heretofore, if there were flaws in aluminum parts, they were normally scrapped.

Brazing of fittings and the like has been by the use of a chloride paste using lithium and cesium. Another paste which has been used for bonding aluminum comprises a combination of zinc chloride, ammonium chloride, and alcohol. However, chloride is disadvantageously corrosive, and cesium may present health problems. A suitable flux for use in a material for bonding aluminum fittings, connections, miscellaneous support angles, and for repairing flawed aluminum parts without such corrosive effects is thus desired.

In order to be effective, the melting temperature of the flux must be below the melting temperature of the aluminum-silicon alloy. By "melting temperature" of a flux, as the term is used in this application, is meant the temperature at which it is fully melted, sufficient for use as a flux, although some melting may begin at a lower temperature. Many $KAlF_4$ fluxes of low purity and corrosive have been provided which melt at a temperature of around 585 degrees C. For example, Nocolok flux containing potassium tetrafluoroaluminate has been found to have a melting point of about 585 degrees C. Since the melting temperature of the aluminum-silicon alloy must be greater than the melting temperature of the flux, this requires that the melting temperature of the aluminum-silicon alloy must be greater than 585 degrees C. for it to be used with such a flux. However, it may be desired to use aluminum-silicon alloys having melting temperatures in the range of about 575 to 585 degrees C. For example, 4047 alloy melts in the range of about 577 to 582 degrees C. Thus, the number of alloys with which a flux having a melting temperature of 585 degrees C. can be used is limited.

As discussed in Yamawaki et al, fluoroaluminate complexes have been produced by either a so called fusion process or by a wet process. One fusion process involves fusing a mixture of simple fluoride compounds and converting the resultant mixture into a fused coagulation. Fluoroaluminate complexes may be formed in other fusion processes. For example, a suitable potassium fluoroaluminate complex may be formed as a by-product in the manufacture of titanium diboride and further processed to a flux by addition of lithium fluoride followed by further fusion. The wet process involves dissolving hydroxides of the metallic components of a flux such as aluminum hydroxide, potassium hydroxide, or lithium hydroxide in an aqueous hydrofluoric acid solution, allowing the hydroxides to react with one another and with the acid to form fluoroaluminates and drying the resultant complexes.

As distinguished from other potassium fluoroaluminate fluxes, a high purity $KAlF_4$ flux is desirable in that it would not result in the corrosive residues on parts being brazed requiring an additional washing and drying step at additional cost and would have a melting temperature of about 575 degrees C. allowing its use with aluminum-silicon alloys having melting temperatures as low as about 575 degrees C. Since even high purity $KAlF_4$ flux has a melting temperature only as low as about 575 degrees C., the 570 degrees C. melting temperature discussed in the Suzuki et al '716 patent, at col. 1, lines 46 and 47, is believed to have been meant to refer to the temperature at which the $KAlF_4$ flux thereof first begins to melt, and, given the previously discussed corrosive impurities therein, it is believed that the temperature at which its flux is fully melted is probably about 585 degrees C. or higher.

It is therefore an object of the present invention to provide an improved method of making potassium tetrafluoroaluminate so that high purity is achieved.

In accordance with the present invention high purity potassium tetrafluoroaluminate is made by adding hydrofluoric acid to high purity aluminum metal powder to thereby form aluminum fluoride in solution. Nitric acid is added to this solution whereby impurities in the solution dissolve into the nitric acid. Water is then added to the solution to precipitate therefrom solid aluminum fluoride, which may then be further washed with water to remove residual impurities therefrom. The solid aluminum fluoride is then milled in the presence of hydrofluoric acid and potassium hydroxide to form the potassium tetrafluoroaluminate which may then be washed for further removal of impurities and dried.

The above and other objects, features, and advantages of the present invention will be apparent in the following detailed description of the preferred embodiments thereof.

DETAILED DESCRIPTION OF THE PREFERRED EMBODIMENTS

In accordance with the present invention a high purity potassium tetrafluoroaluminate ($KAlF_4$) is made by adding hydrofluoric acid (HF), preferably about 70 percent concentration, to high purity aluminum metal powder to thereby form aluminum fluoride in solution. Nitric acid is then added to this solution whereby impurities, including copper and zinc, in the solution dissolve into the nitric acid and are thereafter removed by water washing. Thus, water is then added to the solution to precipitate therefrom solid aluminum fluoride with the nitric acid and dissolved impurities washed free therefrom. This aluminum fluoride after drying is then milled, such as by ballmilling with ceramic balls or by any other method suitable for breaking up the aluminum fluoride into smaller particles, in the presence of hydrofluoric acid, preferably about 70 percent concentration, and potassium hydroxide (KOH), preferably about 50 percent concentration. As the particles of aluminum fluoride are crushed into smaller particles, they are exposed to the hydrofluoric acid and potassium hydroxide, with fluorine from the hydrofluoric acid and potassium from the potassium hydroxide chemically combining therewith, to form the high quality $KAlF_4$. By "high purity potassium tetrafluoroaluminate" is meant, for the purposes of this specification and the claims, a potassium tetrafluoroaluminate which has a purity in the range of about 96 percent or more. Such a high purity is desired to achieve a low melting temperature of about 575 degrees C. and to be devoid of any appreciable corrosive substances which might leave a corrosive film on an aluminum part being brazed therewith. Such a flux purity is distinguished from the purity of the aforesaid Nocolok flux which has been determined to be about 85 percent.

By "high purity aluminum metal powder" is meant, for the purposes of this specification and the claims, an aluminum metal powder having a purity of at least about 99.7 percent or of otherwise sufficient purity to produce high purity $KAlF_4$ by the process described herein.

The hydrofluoric acid is added to the aluminum metal powder in an amount equal to the proper molar proportion plus an excess of perhaps about 10 to 15 percent, all of the percentages named herein being by weight.

The nitric acid is suitably added in an amount equal to between about 3 and 10 percent, preferably about 5 percent, of the hydrofluoric acid.

After washing with the nitric acid, the solution is cooled to room temperature and then washed, preferably three or more times, with water for removing the impurities. The first washing causes the aluminum fluoride to precipitate out, and subsequent washings are desirable to remove any residual impurities including excess hydrofluoric acid from the aluminum fluoride.

The aluminum fluoride particles are milled for a period of several hours to obtain a homogenous mixture and reaction with a particle size preferably between about 7 and 100 micrometers (a range of about 1000 to 150 grit). The product is then washed, preferably three or more times, in water for further purification and dried at a temperature of preferably between about 250 and 300 degrees C.

The process according to the present invention utilizes no mixture of potassium fluoroaluminate complexes such as $K_3AlF_6$, $K_2AlF_5$, $K_2AlF_5+H_2O$, $AlF_3$, and the like which either hydrolyze to corrosive chemical components such as potassium fluoride or increase the melting temperature beyond 575 degrees C. Since the flux according to the present invention absorbs only minimal water (0.4 percent water), it does not absorb enough water to generate corrosive substances, such as hydrogen fluoride or potassium fluoride, during a brazing process. As a result, any flux residues which remain on the surface of a brazed part after brazing with a flux made in accordance with the present invention are generally non-corrosive.

A flux according to the present invention may be applied for brazing by spraying, dipping, or brushing an aqueous suspension or may be applied in a paste or other suitable form.

It should be understood that while the present invention has been described in detail herein, the invention can be embodied otherwise without departing from the principles thereof. Such other embodiments are meant to come within the scope of the present invention as defined by the appended claims.

What is claimed is:

1. A method of making potassium tetrafluoroaluminate comprising the steps of:
   a. adding hydrofluoric acid to aluminum metal powder having a purity of at least about 99.7 percent to thereby form aluminum floride in solution;
   b. adding nitric acid to the solution whereby impurities in the solution dissolve into the nitric acid;
   c. adding water to the solution to thereby precipitate from the solution solid aluminum fluoride with impurities removed therefrom; and
   d. milling the aluminum fluoride in the presence of hydrofluoric acid and potassium hydroxide thereby forming potassium tetrafluoroaluminate.

2. A method according to claim 1 further comprising washing the potassium tetrafluoroaluminate in water.

3. A method according to claim 1 wherein the step of milling the aluminum fluoride comprises reducing the aluminum fluoride to obtain a potassium tetrafluoroaluminate particle size between about 7 and 100 micrometers and washing the potassium tetrafluoroaluminate in water.

4. A method according to claim 1 wherein the step of milling the aluminum fluoride includes mixing the aluminum fluoride with a stoichiometric proportion of hydrofluoric acid and potassium hydroxide.

5. A method according to claim 4 comprising providing a stoichiometric proportion of hydrofluoric acid having a concentration of about 70 percent and potassium hydroxide having a concentration of about 50 percent.

6. A method according to claim 1 further comprising washing at least once with water the precipitated aluminum fluoride.

7. A method according to claim 1 wherein the step of adding the hydrofluoric acid includes adding the hydrofluoric acid in an amount in excess of the molar proportion for the formation of aluminum fluoride.

8. A method of making potassium tetrafluoroaluminate having a purity of at least about 96 percent comprising the steps of:
   a. adding hydrofluoric acid to aluminum metal powder having a purity of at least about 99.7 percent in an amount in excess of the molar proportion for the formation of aluminum fluoride to thereby form aluminum fluoride in solution;
   b. adding nitric acid in an amount equal to between about 3 and 10 percent of the hydrofluoric acid to the solution whereby impurities in the solution dissolve into the nitric acid;
   c. adding water to the solution to thereby precipitate from the solution solid aluminum fluoride with impurities removed therefrom;
   d. washing the precipitated aluminum fluoride at least once with water;
   e. milling the aluminum fluoride in the presence of hydrofluoric acid and potassium hydroxide thereby forming potassium tetrafluoroaluminate;
   f. washing the potassium tetrafluoroaluminate in water; and
   g. drying the potassium tetrafluoroaluminate.

9. A method according to claim 8 further comprising selecting the hydrofluoric acid to have a concentration of about 70 percent and the potassium hydroxide to have a concentration of about 50 percent.

10. Potassium tetrafluoroaluminate having a purity of at least about 96 percent and made by a process comprising the steps of adding hydrofluoric acid to aluminum metal powder having a purity of at least about 99.7 percent to thereby form aluminum fluoride in solution, adding nitric acid to the solution whereby impurities in the solution dissolve into the nitric acid, adding water to the solution to thereby precipitate from the solution aluminum fluoride with impurities removed therefrom, and milling the aluminum fluoride in the presence of hydrofluoric acid and potassium hydroxide thereby forming potassium tetrafluoroaluminate.

11. Potassium tetrafluoroaluminate according to claim 10 wherein the potassium tetrafluoroaluminate has a particle size between about 7 and 100 micrometers.

* * * * *

UNITED STATES PATENT AND TRADEMARK OFFICE
Certificate

Patent No. 5,242,669            Patented: September 7, 1993

On petition requesting issuance of a certificate for correction of inventorship pursuant to 35 U.S.C. § 256, it has been found that the above-identified patent, through error and without any deceptive intent, improperly sets forth the inventorship.

Accordingly, it is hereby certified that the correct inventorship of this patent is: Helmut Flor and Paul J. Conn.

Signed and Sealed this Third Day of January, 1995.

OLIK CHAUDHURI
*Supervisory Patent Examiner*
*Patent Examining Group 1100*